(12) United States Patent
Pathmanathan et al.

(10) Patent No.: US 7,355,131 B2
(45) Date of Patent: Apr. 8, 2008

(54) BATHROOM VANITY WITH STORAGE FOR A WEIGH SCALE

(75) Inventors: Indrakumar Pathmanathan, North York (CA); Gajen Arumugam, North York (CA); Serene H. Gebara, North York (CA); Palaninathan Sivakumar, Tamil Nadu (IN); Ahilan Gengatharan, North York (CA)

(73) Assignee: Magick Woods Ltd., Vaughan (CA)

( * ) Notice: Subject to any disclaimer, the term of this patent is extended or adjusted under 35 U.S.C. 154(b) by 0 days.

(21) Appl. No.: 11/453,400

(22) Filed: Jun. 15, 2006

(65) Prior Publication Data
US 2006/0284526 A1 Dec. 21, 2006

Related U.S. Application Data

(60) Provisional application No. 60/691,937, filed on Jun. 17, 2005.

(30) Foreign Application Priority Data
Nov. 25, 2005 (CA) .................................. 2527841

(51) Int. Cl.
*G01G 19/52* (2006.01)
*A47B 96/00* (2006.01)

(52) U.S. Cl. .................... 177/144; 312/228; 312/330.1

(58) Field of Classification Search ............. 177/25.16, 177/25.19, 142–144; 312/228, 330.1
See application file for complete search history.

(56) References Cited

U.S. PATENT DOCUMENTS

| | | | | |
|---|---|---|---|---|
| 2,872,178 | A * | 2/1959 | Holland | 177/142 |
| 2,924,443 | A * | 2/1960 | Townsend et al. | 177/142 |
| 3,101,803 | A * | 8/1963 | Kleinman | 177/177 |
| 4,288,131 | A * | 9/1981 | Griffin | 312/245 |
| 4,582,151 | A * | 4/1986 | Mairot et al. | 177/144 |
| 5,277,487 | A * | 1/1994 | Simon | 312/278 |
| 5,706,678 | A * | 1/1998 | Sasaki | 68/13 R |
| 6,224,176 | B1 * | 5/2001 | Suzuki | 312/278 |
| 6,590,166 | B2 * | 7/2003 | Yoshida | 177/25.13 |
| 6,726,296 | B2 * | 4/2004 | McGilton | 312/228 |
| 6,781,067 | B2 * | 8/2004 | Montagnino et al. | 177/25.13 |
| 6,864,436 | B1 * | 3/2005 | Nobes et al. | 177/25.13 |
| 7,138,586 | B1 * | 11/2006 | Kim | 177/126 |

* cited by examiner

*Primary Examiner*—Randy W Gibson
(74) *Attorney, Agent, or Firm*—Foley & Lardner LLP

(57) ABSTRACT

A novel bathroom vanity provides storage space for a bathroom scale and makes efficient use of the volume occupied in the bathroom by the vanity. In several embodiments, the bathroom scale is stored in a drawer in a kick panel, the drawer being moved between a closed position, wherein the scale is stored, and an open position wherein the scale can be used. Preferably, the scale is capable of providing a digital output of its readings to a digital display on the vanity.

9 Claims, 8 Drawing Sheets

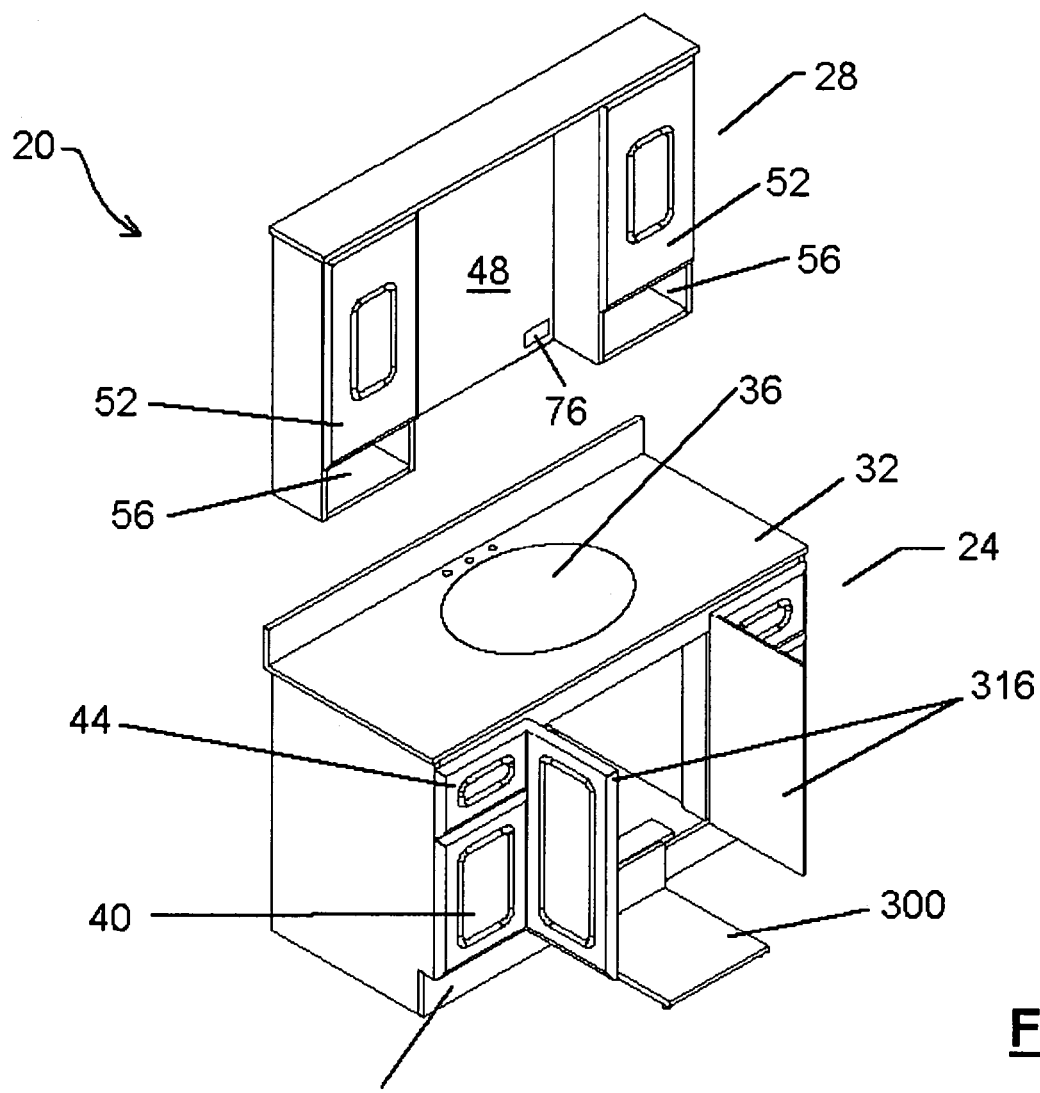
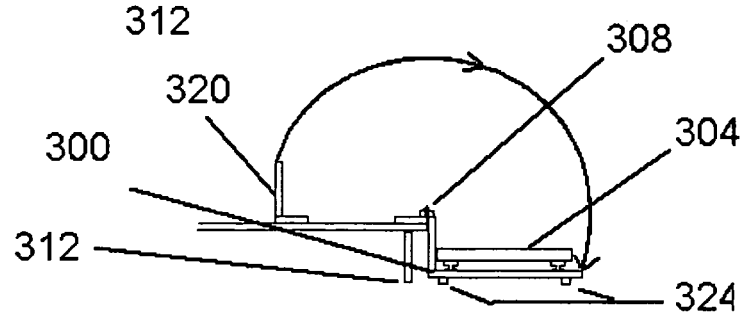
Fig. 8
Fig. 9

BATHROOM VANITY WITH STORAGE FOR A WEIGH SCALE

CROSS-REFERENCE TO RELATED PATENT APPLICATIONS

This Application claims the benefit under 35 U.S.C. 119(a) of Canadian Patent Application No. 2,527,841, having a filing date of Nov. 25, 2005, titled "BATHROOM VANITY," and under 35 U.S.C. 119(e) of U.S. Provisional Application No. 60/691,937, having a filing date of Jun. 17, 2005, titled "BATHROOM VANITY," the disclosures of which are hereby incorporated by reference.

FIELD OF THE INVENTION

The present invention relates to furniture for a bathroom or the like. More specifically, the present invention relates to bathroom vanities and the like.

BACKGROUND OF THE INVENTION

In the last decade or two, increasing health consciousness among individuals has resulted in most bathrooms including a weigh scale. Such weigh scales occupy floor space, which is often quite limited in a bathroom, and typically are unattractive and/or difficult to match to the décor of the bathroom.

In the last decade or two, increasing health consciousness among individuals has resulted in most bathrooms including a weigh scale. Such weigh scales occupy floor space, which is often quite limited in a bathroom, and typically are unattractive and/or difficult to match to the décor of the bathroom. Further, with technological developments in health equipment and other information systems, individuals can now have a great deal of information available to them which would usefully be accessed in the bathroom. However, to date there has not been any safe and/or convenient way to access such information in the bathroom.

It is desired to have a bathroom vanity which provides effective storage space for a weigh scale such that the weigh scale no longer occupies floor space when not in use and such that the weigh scale is not visible when stored. It is further desired to have a bathroom vanity which provides a mechanism for the safe and convenient way to access information of interest to the bathroom user.

SUMMARY OF THE INVENTION

It is an object of the present invention to provide a novel bathroom vanity which obviates or mitigates at least one disadvantage of the prior art.

According to a first aspect of the present invention, there is provided a bathroom vanity comprising: a structure for supporting a sink and including at least one storage volume, the structure further including a bathroom scale storage device. Preferably, the vanity includes a kick panel and the bathroom scale storage device is located in the kick panel. Also preferably, the bathroom scale storage device comprises a drawer in the kick panel, the drawer receiving a bathroom scale and being moveable between a closed position wherein the drawer is flush with the kick panel and an open position wherein the drawer extends from the kick panel to provide access to the scale.

The present invention provides a bathroom vanity which provides storage space for a bathroom scale and which makes efficient use of the volume occupied in the bathroom by the vanity. In several embodiments, the bathroom scale is stored in a drawer in a kick panel, the drawer being moved between a closed position, wherein the scale is stored, and an open position wherein the scale can be used. Preferably, the scale is capable of providing an output of its readings to a digital display on the vanity. Also preferably, the digital display is multifunction allowing the display of a variety of information to a user.

BRIEF DESCRIPTION OF THE DRAWINGS

Preferred embodiments of the present invention will now be described, by way of example only, with reference to the attached Figures, wherein:

FIG. 8 shows a front and side perspective view of another bathroom vanity in accordance with the present invention;

FIG. 9 shows a side view of a bathroom scale storage device of FIG. 8;

DETAILED DESCRIPTION OF THE INVENTION

Figure 1:
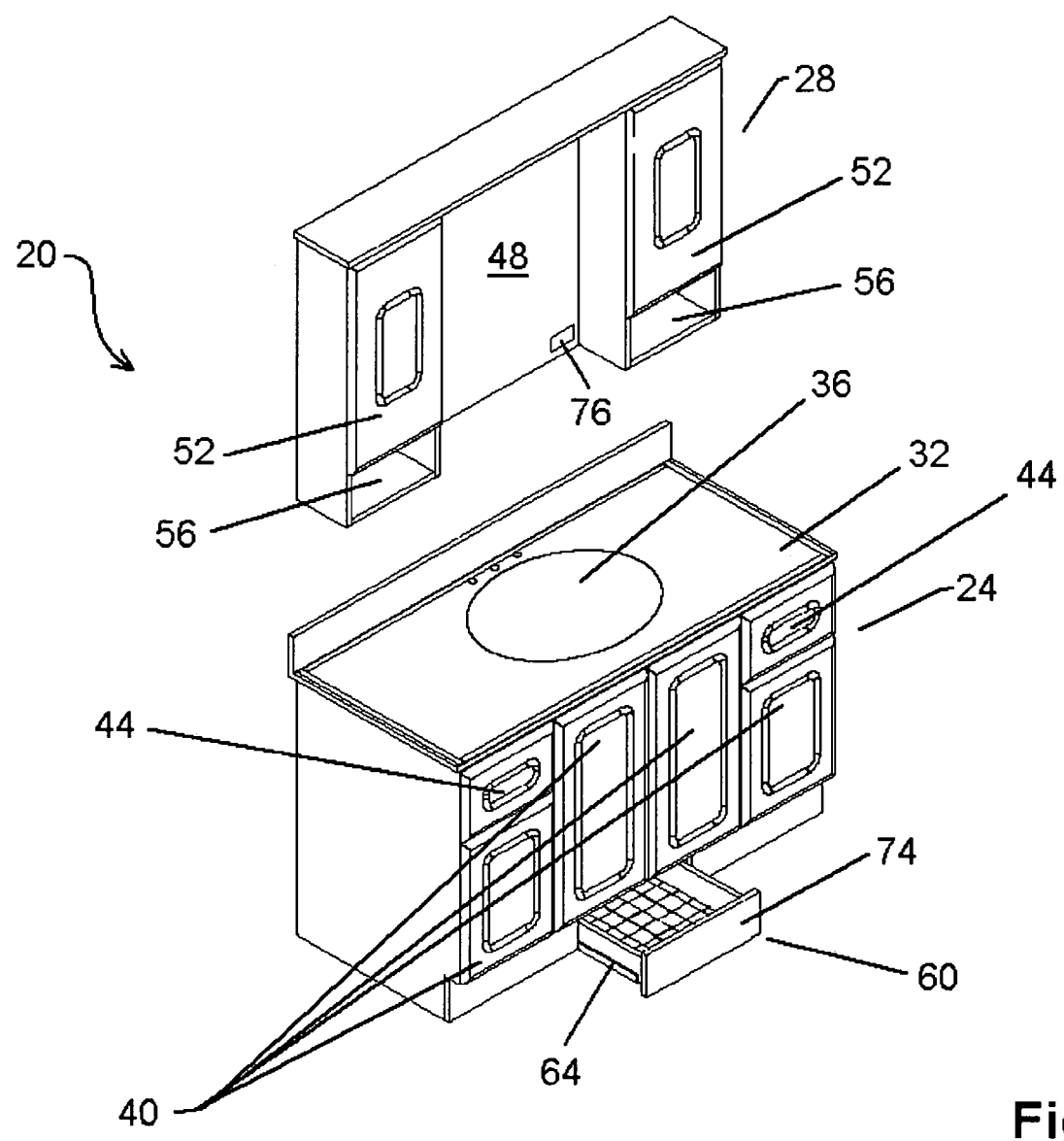
FIG. 1 shows a front and side perspective view of a bathroom vanity in accordance with the present invention.

A bathroom vanity in accordance with the present invention is indicated generally at 20 in FIG. 1. Vanity 20 includes a vanity base 24 and a medicine chest 28.

As shown, vanity base 24 supports a counter top 32 and a sink 36 which can be integrally formed in countertop 32, or sink 36 can be a separate component mounted in counter top 32. Vanity base 24 preferably further includes a set of storage compartments, such as cupboards 40 and pull-out drawers 44.

In the illustrated embodiment, medicine chest 28 is separate from vanity base 24 and is attached, at a point above vanity base 24, to a wall in the bathroom. However, as will be apparent to those of skill in the art, medicine chest 28 can also be integral with vanity base 24. Medicine chest 28 typically includes at least one mirror 48 and one or more storage volumes, such as cupboards 52 and/or nooks 56.

Vanity bases usually include a kick panel between the bottom of the doors to the cupboards, and/or any lower drawers, and the floor to permit clearance for the doors and/or drawers to open and to raise the bottom of the cupboards, and/or drawers to a height which is more convenient for users to access. Typically, the space behind kick panel is unused "dead space", although it is also known to provide a small cupboard or drawer in this dead space, instead of a kick panel.

Figure 2:
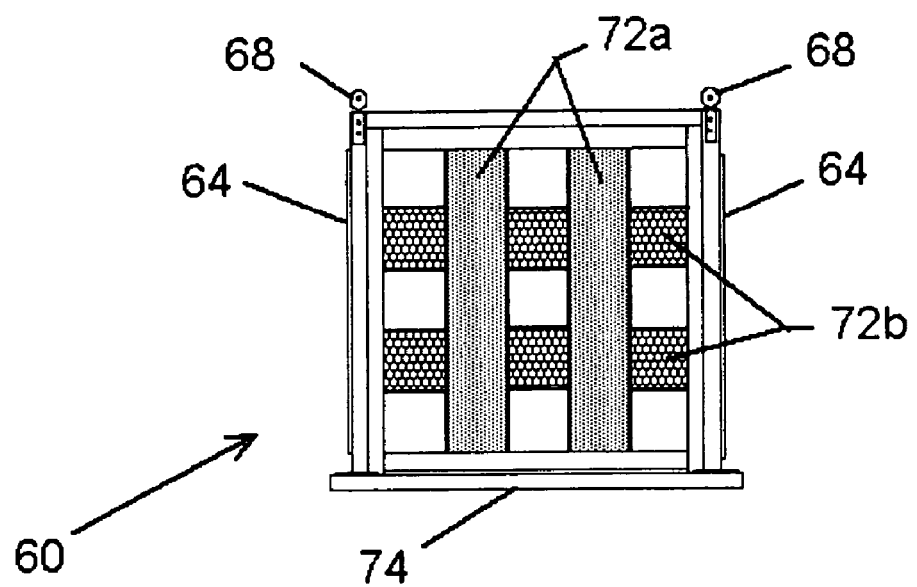
FIG. 2 shows a top view of a bathroom scale drawer of the vanity of FIG. 1.

Unlike the prior art, vanity 20 includes a bathroom scale storage device, in this embodiment bathroom scale drawer 60, shown in FIGS. 1 and 2. Drawer 60 is located where a kick panel would conventionally be placed and is slidably mounted in vanity base 24 via a pair of drawer tracks 64. Drawer 60 further preferably includes a biasing means which biases drawer 60 to the open position, shown in FIG. 1.

In the illustrated embodiment, best seen in FIG. 2, the biasing means comprises a pair of spring loaded members 68, mounted to drawer 60, which abut a rear panel of vanity base 24 when drawer 60 is moved from the open position and which bias drawer 60 towards the open position.

As will be apparent to those of skill in the art, the biasing means can be provided in many other configurations and arrangements, such as mounting spring loaded members 68 on the rear panel of vanity base 24 to abut the back of drawer 60, providing an elastic member (not shown) extending across the space into which drawer 60 fits when in the closed position—the elastic member being tensioned when drawer 60 is moved to the closed position, providing a pressurized gas or hydraulic piston between drawer 60 and vanity base 24, or any other suitable means for biasing drawer 60 towards the open position.

Drawer 60 further includes a toggle latch (not shown) which operates such that a first press on the front of drawer 60 releases the latch to allow the biasing means to move drawer 60 to the open position and a second press on the front of drawer 60, as the drawer is moved against the biasing means to a closed position wherein drawer 60 is substantially under vanity base 24, caused the latch to engage and maintain drawer 60 in the closed position. Such toggle latches are well known and are available from a variety of manufacturers and in a variety of designs.

In use, a user can press on the front of drawer 60 with a toe or other part of their foot to unlatch drawer 60 which is then biased to the open position by the biasing means. When finished with drawer 60, the user again presses the front of drawer 60 with a toe, or other part of their foot, to return drawer 60 to the closed position, overcoming the biasing force of the biasing means, and latching the toggle latch so that drawer 60 is maintained in the closed position.

In a presently preferred embodiment, a toggle latch, available from Richelieu Hardware, 6420 Viscount Road, Mississauga, Ontario, Canada and referred to as a Drawer Kicker, part number 102111, is employed with drawer 60. The Drawer Kicker toggle latch is attached to the rear panel of vanity base 24, adjacent where the back cross piece of drawer 60 is located when drawer 60 is in the closed position or to the back of the cross piece of drawer 60, and the Drawer Kicker toggle latch performs both the above-described toggle latch functionality and also acts as a biasing means to bias drawer 60 to the open position when the latch is pushed and released.

As illustrated, drawer 60 does not include a conventional bottom panel but instead includes a webbing of elastic straps 72 which serves instead of a bottom panel. In the illustrated embodiment, drawer 60 includes a pair of elastic straps 72a extending between the sides of drawer 60 and another pair of elastic straps 72b extending from the front to the back of drawer 60. The number, arrangement, size and elastic force of straps 72 is selected such that straps 72 will support the weight of a bathroom scale in drawer 60 when the scale is not in use and will stretch to allow the bathroom scale to rest upon the bathroom floor when a user is standing on the scale. Thus, when the user is standing on the bathroom scale, straps 72 stretch such that the scale is supported by the bathroom floor and the scale can operate in a conventional manner. When the user steps off the scale, straps 72 contract, due to their elastic force, lifting the scale up and back into drawer 60.

In this manner, drawer 60 need not be constructed to carry the weight of the user and the scale and instead need only be constructed with sufficient strength to carry the forces generated by the weight of the scale and the forces transmitted by straps 72. Further, by allowing the scale to be supported by the bathroom floor, no brake or other mechanism is required to prevent drawer 60 from moving when a user is standing on the scale as drawer 60 is effectively immobilized by the scale being in contact with the bathroom floor.

To accommodate any irregularities in the floor on which vanity base 24 is installed, drawer 60 preferably includes a front panel 74 whose height is slightly less than the space in the front of vanity base 24 into which it is received. Front panel 74 is mounted to drawer tracks 64, and their associate drawer side members, such that the vertical positioning of front panel 74 with respect to drawer tracks 64, and thus vanity base 24, can be adjusted to vertically clear minor irregularities in the floor on which vanity base 24 is installed or carpets, etc. It is contemplated that a vertical adjustment of as much as one quarter of an inch will suffice in most circumstances, although larger or smaller adjustment ranges can be provided if desired.

The method of attaching front panel 74 to drawer tracks 64 is not particularly limited and a variety of mechanisms can be employed. For example, an angle bracket attached directly or indirectly to drawer tracks 64 can be employed, the angle bracket including vertical slots through which mounting screws extend into front panel 74, the slots allowing the screws and front panel 74 to be vertically positioned as desired. As will be apparent to those of skill in the art, as front panel 74 is moveable with respect to drawer tracks 64 and drawer tracks 64 are mounted in a fixed relationship to vanity base 24, vertical adjustment of front panel 74 does not result in vertical adjustment of the rest of drawer 60 with respect to vanity base 24.

If desired, vanity base 24 can be equipped with conventional storage drawers or cupboards, instead of kick panels, on either side of the volume which receives drawer 60. In the case that storage drawers are provided, these storage drawers can also feature vertically adjustable front panels, similar to front panel 74.

The actual bathroom scale employed is not limited, except in regard of fitting within drawer 60, and can be a mechanical scale, a digital electronic scale, etc. A digital electronic scale, which can provide other health related information such as percentage body fat, etc., is presently preferred for use with vanity 20. For example, the digital weigh scale in drawer 60 can offer a range of other services such as measuring percentage body fat, percentage of water content, pulse, etc. Scales which can provide these measurements, or various subsets of these measurements are known.

In particular, a digital electronic scale which supports a remote readout is presently preferred. For example, such a digital electronic scale can communicate its readings, via radio frequency transmission, infrared transmission or wired connection to a readout which is located substantially at eye height of a user standing on the scale. Many suitable radio frequency or infrared communications techniques for communicating with such remote readouts will be apparent to those of skill in the art, including Bluetooth, 802.11x, IrDA, wired Ethernet, etc.

In the embodiment of FIG. 1, a remote digital display 76 is provided on mirror 48 of medicine chest 28. In a presently preferred embodiment, remote digital display 76 is located behind mirror 48 overlying a region of mirror 48 which is not coated with reflective material, or which has a thinner coating of such material, such that the information displayed by display 76 is visible through mirror 48. However, it is also contemplated that display 76, in a suitable moisture resistant enclosure, can be mounted to the front side of mirror 48 of elsewhere on medicine chest 28, vanity base 24 or even on a wall or other structure in the bathroom in which vanity 20 is installed.

If the digital electronic scale includes one or more controls to alter its operation, such as a switch to change the displayed weight from metric units to English units, or to change the display from displaying weight to displaying the percentage body fat, etc., such controls can be included with display 76 and can communicate with the scale via the above-mentioned radio, infrared or wired communications techniques to allow the user to operate the scale without the need to stoop to reach controls on the scale.

Figure 3:
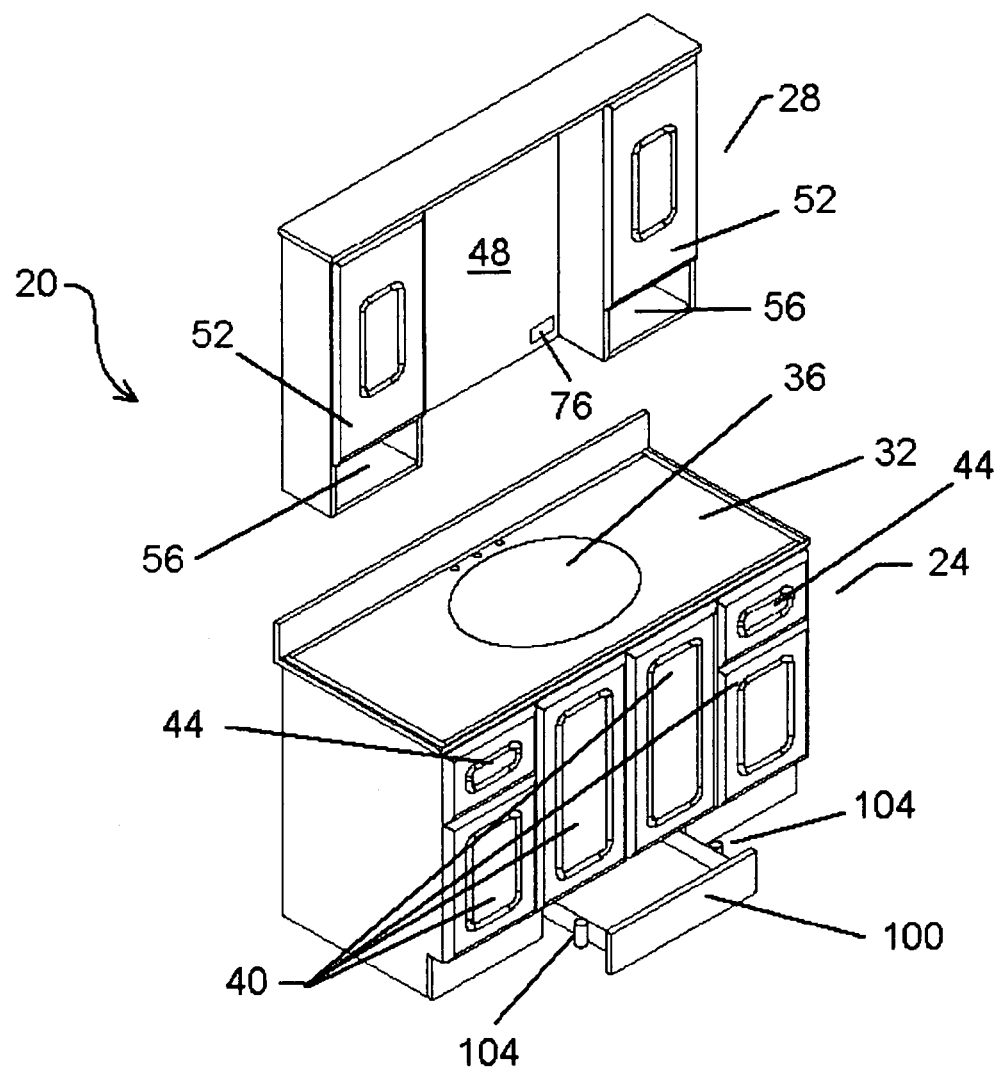
FIG. 3 shows a front and side perspective view of another bathroom vanity in accordance with the present invention.
Figure 4:
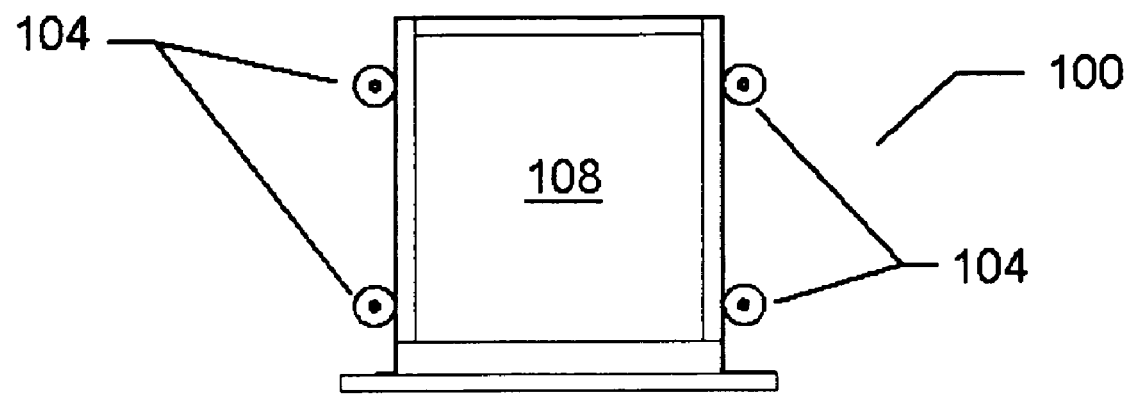
FIG. 4 shows a top view of a bathroom scale drawer of the vanity of FIG. 3.
Figure 5:
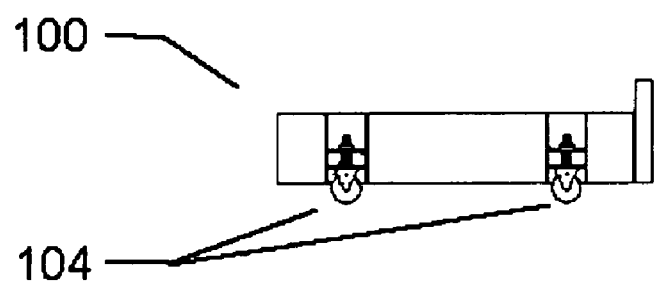
FIG. 5 shows a side view of the bathroom scale drawer FIG. 3.

Another embodiment of bathroom vanity 20 is illustrated in FIGS. 3 through 5, wherein like components to those of FIGS. 1 and 2 are indicated with like reference numerals. In this embodiment, bathroom scale drawer 100 is equipped with support rollers 104 which engage the bathroom floor on which vanity 20 is installed and allow drawer 100 to be slid between open and closed positions. Unlike with drawer 60 described above, drawer 100 includes a rigid bottom panel 108 to support a bathroom scale. However, as before, drawer 100 is preferably equipped with a toggle latch to provide a "push to latch, push to unlatch" functionality. Also as before, vanity 20 is equipped with a biasing means to urge drawer 100 to the open position, illustrated in FIG. 3, when the toggle latch is unlatched. In the illustrated embodiment, the biasing means is an elastic strap (not shown) extending across the volume into which drawer 100 is moved when being placed in the closed position. The rear of drawer 100 contact the elastic strap and tensions it as drawer 100 is moved to the closed position and this strap urges drawer 100 to the open position.

The roller portion of support rollers 104 which engages the bathroom floor are spring mounted within the housings of support rollers 104 and operate such that, as a user stands on a scale in drawer 100, the springs of support rollers 104 are compressed, bringing the underside of panel 108 into contact with the bathroom floor. At the same time, the upper surface of the roller portions of support rollers 104 engage a surface within the housing of support rollers 104, this engagement of the rollers with the surface acting as a brake to prevent movement of drawer 100 when a user is standing on a scale therein.

Figure 6:
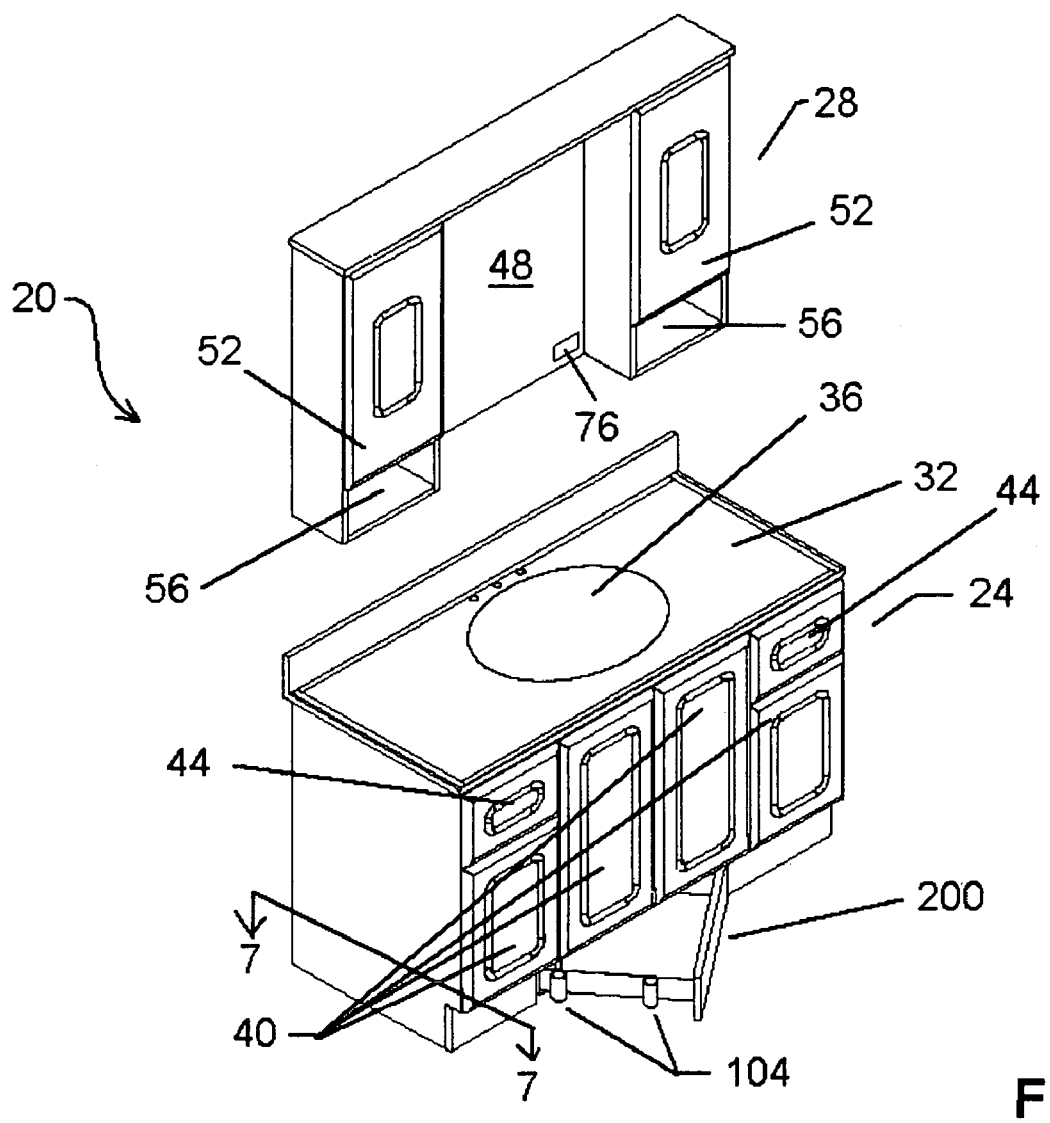
FIG. 6 shows a front and side perspective view of another bathroom vanity in accordance with the present invention.
Figure 7:
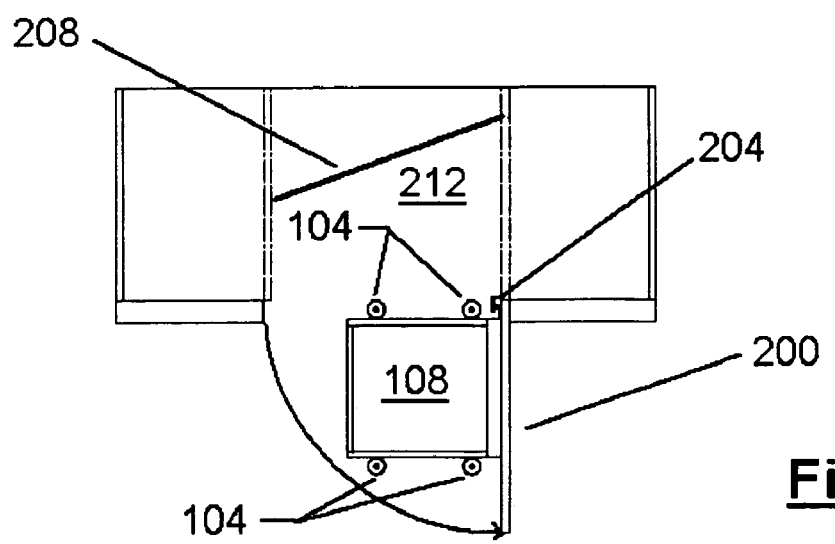
FIG. 7 shows a section taken along line 7-7 of FIG. 6.

FIGS. 6 and 7 show another embodiment of the present invention, similar to that shown in FIG. 3 through 5, wherein like components are indicated with like reference numerals. In this embodiment, bathroom scale drawer 200 is pivotally mounted to vanity base 24 by a hinge 204 located adjacent one side of drawer 200 which allows drawer 200 to be pivoted from the closed position to the open position illustrated in FIG. 7. As before, drawer 200 is preferably equipped with a toggle latch and hinge 204 also permits vertical movement of drawer 200 to allow the springs in support rollers 104 to be compressed, so that panel 108 is supported by the bathroom floor. Further, as before, a biasing means is provided to bias drawer 200 to the open position. In the illustrated configuration, the biasing means is an elastic strap 208 extending across the space 212 occupied by drawer 200 when in the closed position.

Yet another embodiment of the present invention is illustrated in FIGS. 8 and 9 wherein like components to those of embodiments discussed above are indicated with like reference numerals. In this embodiment, the bathroom scale storage device comprises a support platform 300 to which a bathroom scale 304 can be attached. Platform 300 is attached to vanity base 24 via a hinge 308, which allows platform 300 to be pivoted up and over kick panel 312 and into the volume behind cupboard doors 316. A stop support 320 is provided to support the end of platform 300 distal hinge 308 when platform 300 is in the closed position and platform 300 is also preferably equipped with one or more resilient pads 324 to engage the bathroom floor to prevent damage to the bathroom floor and/or to reduce noise when platform 300 is brought into engagement with the bathroom floor. As will be apparent to those of skill in the art, the bathroom scale should be fastened to platform 300 such that the scale remains attached thereto when platform 300 is in the closed position and the scale is inverted thereon. Further, it is contemplated that platform 300 can be further equipped with a biasing means, such as a coil spring on hinge 308, to assist in moving platform 300 from the closed position to the open position.

Figure 10:
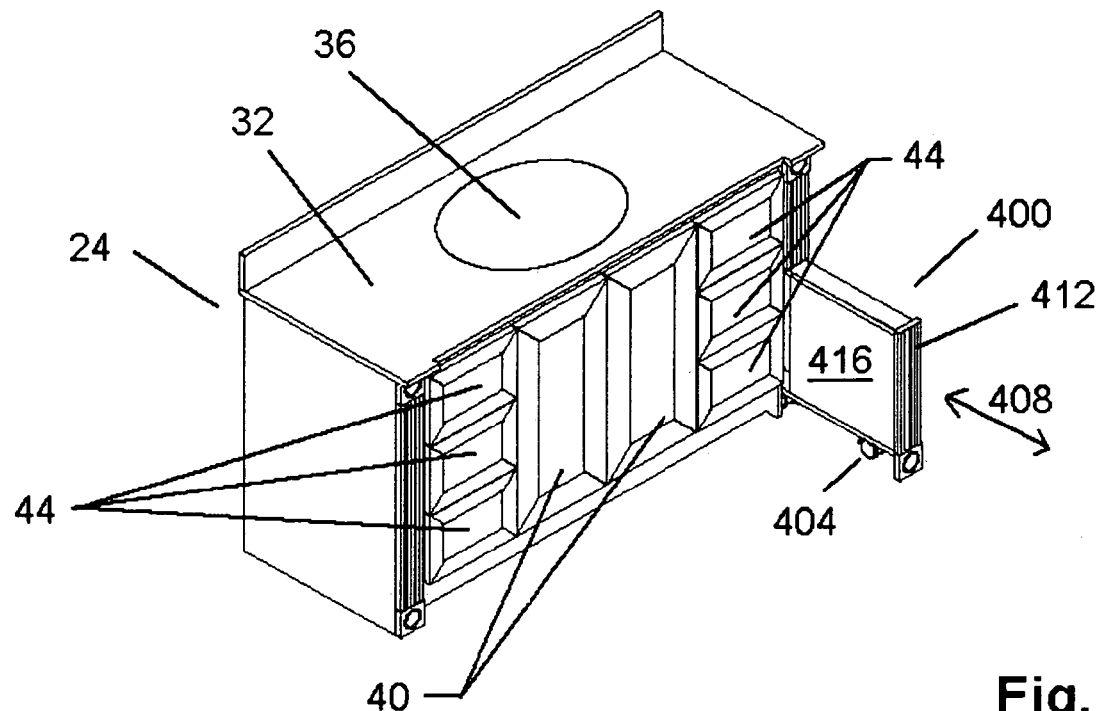
FIGS. 10 and 11 show front and side perspective views of another bathroom vanity in accordance with the present invention.
Figure 11:
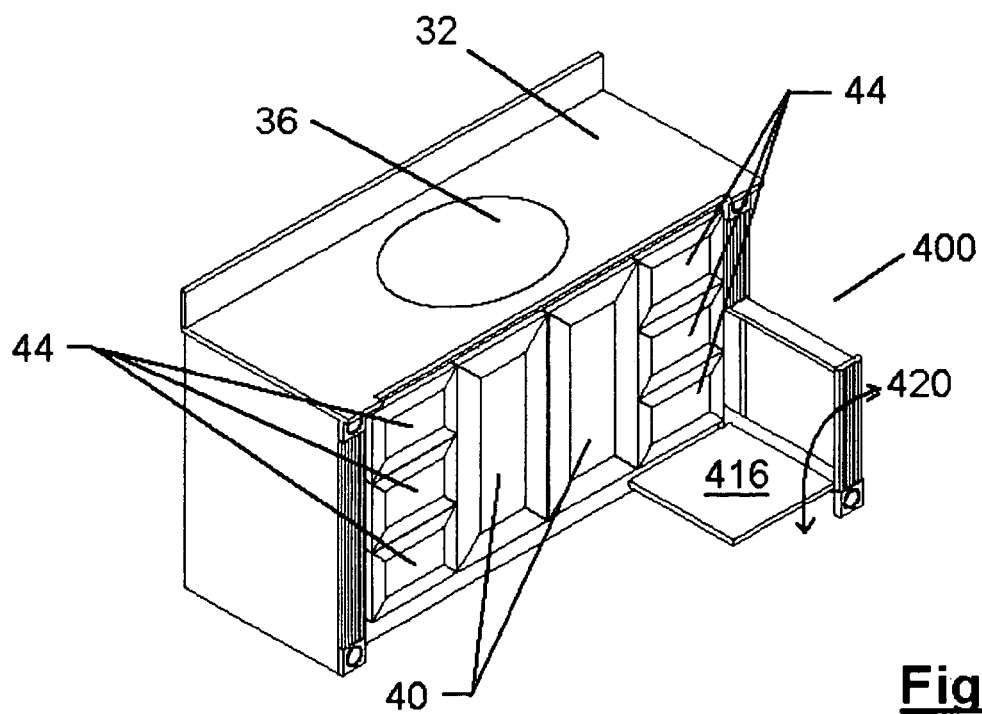

FIGS. 10 and 11 shows another embodiment of the present invention wherein like components to those of embodiments discussed above are indicated with like reference numerals. In this embodiment, vanity base 24 includes a bathroom scale storage device which comprises a pull out scale compartment 400. Compartment 400 includes a roller 404 to engage the bathroom floor to support compartment 400 and compartment 400 slides, as indicated by arrow 408, in roller tracks, not shown, between a closed position wherein the front 412 of compartment 400 is flush with the front of vanity base 24 and the open position illustrated in FIG. 11. Compartment 400 is slid out of vanity base 24 until a scale support platform 416, which is mounted to compartment 400 by a hinge, in a manner very similar to that discussed above with respect to the embodiment shown in FIGS. 8 and 9, is free of vanity base 24 to pivot, as indicated by arrow 420, to the open position shown in FIG. 11. As before, the bathroom scale is suitably fastened to platform 416 and platform 416 can include one or more resilient pads to engage the bathroom floor. Alternatively, a bathroom scale can be directly hinged to compartment 400, eliminating the need for platform 416.

Figure 12:
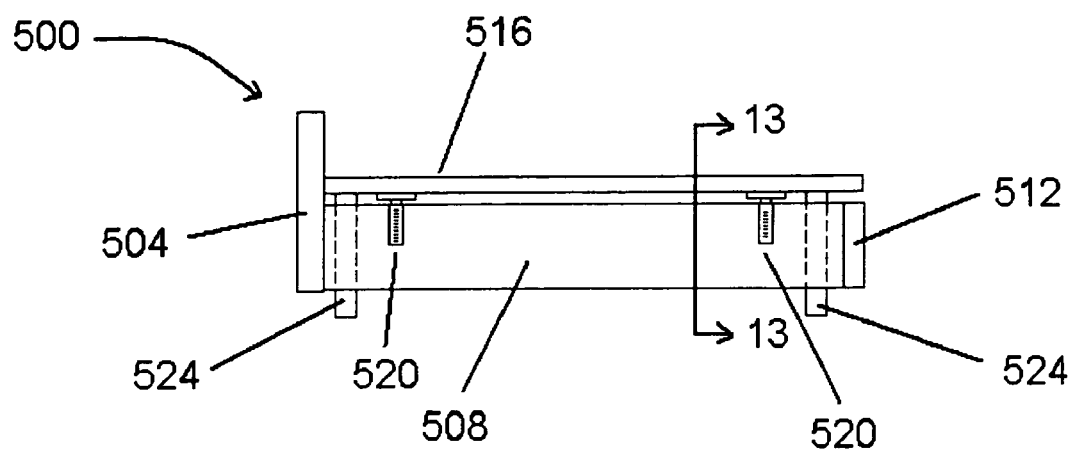
FIG. 12 shows a side view of another bathroom scale drawer for use with a vanity in accordance with the present invention.
Figure 13:
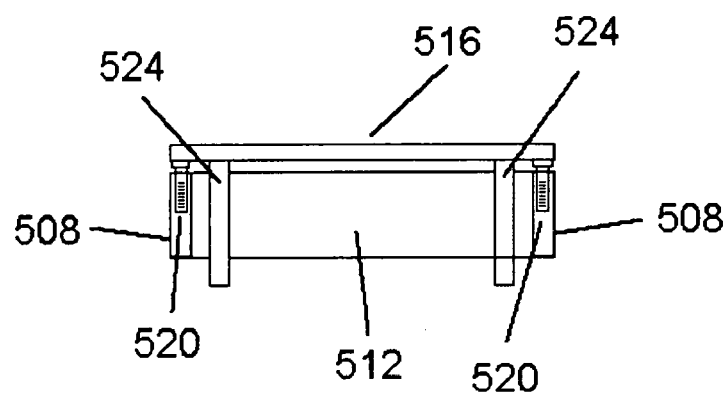
FIG. 13 shows a cross section taken along line 13-13 of FIG. 12.
Figure 14:
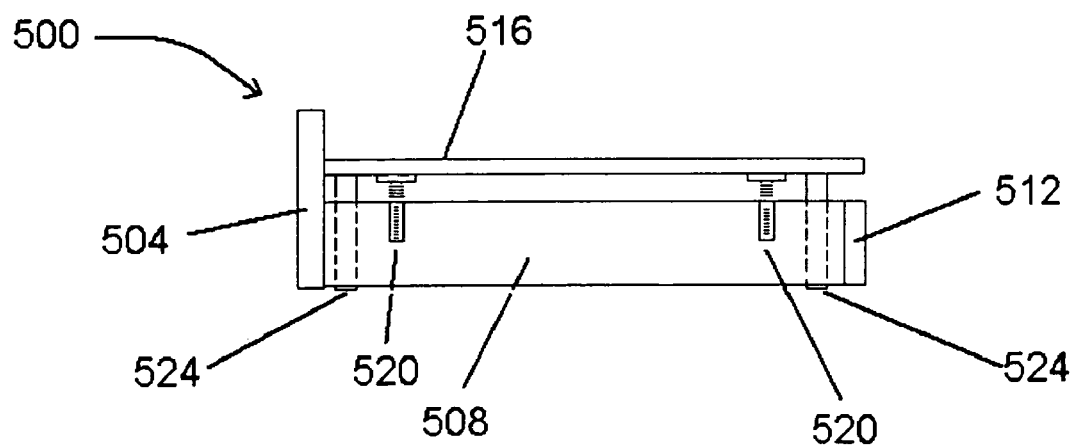
FIG. 14 shows a side view of the drawer of FIG. 12 with the platform in a retracted position.

FIGS. 12, 13 and 14 show another drawer 500 for holding a weigh scale in accordance with the present invention. Drawer 500, which can be installed in vanity 24 of FIG. 1 or the like, comprises a rectangular shaped drawer frame comprising a front panel 504, a pair of drawer sides 508 and a rear cross member 512. Front panel 504 can be attached to drawer sides 508 to allow for vertical adjustment of front panel 504, as discussed above, and drawer tracks can be attached to drawer sides 508, or any other suitable means employed, to allow drawer 500 to move into and out of the vanity it is installed in.

The drawer frame of drawer 500 supports a platform 516 upon which a weigh scale or other device can be placed. Platform 516 is mounted to the drawer frame by spring guides 520 which extend between drawer sides 508 and platform 516. Each spring guide 520 includes a coil spring which is at least partially inserted into a bore in drawer side 508 and one end of the coil spring abuts the bottom of the bore while the opposite end abuts the underside of platform 516.

Platform 516 further includes a set of depending legs 524 which preferably are closely adjacent the inner surfaces of the drawer frame to inhibit lateral movement of platform 516 with respect to the drawer frame. Further, each spring guide 520 can include a pin depending from platform 516 into the respective bore in drawer sides 508, with the coil spring encircling the pin to further inhibit lateral movement of platform 516.

In use, platform 516 and the device (weigh scale, etc.) installed on it is supported by spring guides 520 such that legs 524 are not in contact with the floor as drawer 500 is moved between open and closed positions in the vanity, as shown in FIG. 14.

When a user steps onto the weigh scale of other device on platform 516, the springs in spring guides 520 are compressed and platform 516 moves down until legs 524 contact the floor to stop further downward movement of platform 516 and to support the user on the device, as illustrated in FIGS. 12 and 13. The length of legs 524 is selected such that platform does not directly contact the drawer frame and legs 524 can be equipped with rubber or other non-skid members on their lower ends to prevent movement of drawer 500 while legs 524 are in contact with the floor.

As will be apparent to those of skill in the art platform 516 need not have four depending legs 524. If spring guides 520 or any other suitable method is employed to inhibit lateral movement of platform 516, then platform 516 can have any number of legs 524 as desired, including having only a single, albeit somewhat larger, centrally located leg 524.

It is contemplated that, if any of the above-described embodiments of vanity 20 is equipped with a digital readout 76, relevant information and/or other information of interest to the bathroom occupant. When combined with other devices which can communicate with readout 76 via radio, infrared, wired Ethernet or other communications techniques, a variety of other functionalities can be offered by vanity 20. Examples of such other information of interest include weather information from an external sensor station, time and date information, television programming and/or web browsing capabilities, etc.

It is further contemplated that other bathroom objects can communicate with readout 76 to provide information of interest to the bathroom occupant. For example, the water tap for sink 36 can include a temperature sensor and a Bluetooth transceiver to provide on readout 76 a measure of the temperature of the water supplied from the tap. Further, a strain gauge, combined with a Bluetooth or other transceiver, can be placed under a tile in the bathroom floor, or under the seat of a toilet or the mounting of the toilet, to provide the weight and other information about a user in place of a conventional bathroom scale.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A bathroom vanity configured to be supported by a floor, the bathroom vanity comprising:
a structure for supporting a sink, the structure including at least one storage volume and a kick panel having a storage drawer configured to receive a weigh scale, the drawer being movable between a closed position wherein the drawer is substantially flush with the kick panel and an open position wherein the drawer extends from the kick panel to provide access to the weigh scale, the drawer being operable in the open position to resiliently support the weigh scale so that the weigh scale is supported by the floor when a user mounts the weigh scale and is supported by the structure when no user is on the weigh scale.

2. The bathroom vanity of claim 1 wherein the scale is resiliently supported with the drawer via at least one elastic member, the at least one elastic member deforming under a user's weight, when a user mounts the scale, to bring the scale into contact with the floor supporting the vanity.

3. The bathroom vanity of claim 1 wherein the drawer is supported by at least one roller, the roller being spring loaded to maintain the drawer off of the floor.

4. The bathroom vanity of claim 3 wherein the drawer slides between the closed position and the open position.

5. The bathroom vanity of claim 1 wherein the drawer pivots between the closed position and the open position.

6. The bathroom vanity of claim 1 further including a digital readout, the digital readout being operable to receive signals corresponding to a measurement of weight from the weigh scale and to display the measured weight.

7. The bathroom vanity of claim 6 wherein the digital readout is operable to display other information of interest to the user.

8. The bathroom vanity of claim 1 wherein the drawer includes a drawer frame moveably connected to the vanity and a platform resiliently supported by the drawer frame, the platform including at least one leg depending from the platform and the resilient support operating to support the platform such that the at least one leg does not contact the floor until a user stands on a weigh scale on the platform.

9. The bathroom vanity of claim 6 further comprising a medicine chest, the digital display being located in the medicine chest.

* * * * *